United States Patent [19]
Koffler

[11] 3,876,504
[45] Apr. 8, 1975

[54] PROCEDURE FOR DETERMINATION OF ANTIGENS AND ANTIBODIES AND ARTICLES FOR USE THEREWITH

[75] Inventor: David Koffler, Palisades, N.Y.

[73] Assignee: The Early Warning Company, New York, N.Y.

[22] Filed: June 10, 1974

[21] Appl. No.: 477,915

[52] U.S. Cl. .................. 195/103.5 R; 23/230 B
[51] Int. Cl. ..................... C07g 7/00; C12k 1/00
[58] Field of Search ............ 195/103.5 R; 23/230 B

[56] References Cited
UNITED STATES PATENTS
3,236,732   2/1966   Arquilla ........................... 23/230 B
3,654,090   4/1972   Schuurs et al. ............... 195/103.5 R

*Primary Examiner*—A. Louis Monacell
*Assistant Examiner*—C. A. Fan
*Attorney, Agent, or Firm*—Ryder, McAulay, Fields, Fisher & Goldstein

[57] ABSTRACT

The invention relates to a test slide to be employed in the determination of antigens or antibodies, particularly antigens or antibodies in human body fluids, and a procedure for use of the slide. The procedure involves bonding of one component of the antigen-antibody reaction group to an insoluble member on the test slide and flooding to this test slide with a mixture of the other component, bonded to a color-forming agent, and a body fluid which may contain the other component.

16 Claims, 2 Drawing Figures

FIG. 1
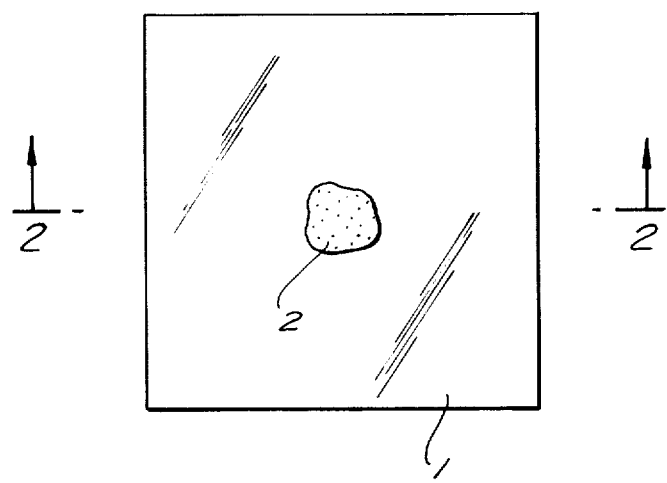
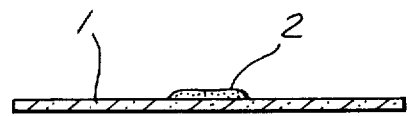
FIG. 2

PROCEDURE FOR DETERMINATION OF ANTIGENS AND ANTIBODIES AND ARTICLES FOR USE THEREWITH

BACKGROUND OF THE INVENTION

The prior art has described a large number of methods and materials for use in determining the presence of antigens and antibodies, particularly in human body fluids. A primary method in use involves radioimmunoassay and the method, in its various forms, is extremely useful in accurate determination of the presence of an antigen or an antibody. However, such a procedure must be carried out in a well equipped laboratory and is, thus, not adapted for use either in a physician's office or by an individual who wishes to make the necessary determination.

In order to overcome the disadvantages of the radioimmunoassay method, particularly in that the method is not susceptible of use by untrained personnel or in less than fully equipped laboratories, various other methods have been developed, including a colorimetric method. However, even the colorimetric methods developed to date require an excessive amount of equipment as they involve, after formation of a known quantity of one of the components of the antigen-antibody reaction members into a form in which it can be used in the test procedure, and the complexing of the other component into some liquid form, the use of the various laboratory techniques which generally require, while not the most sophisticated equipment, laboratory equipment which is not available to every doctor and, certainly, not to an individual. For example, though a colorimetric method is shown for this type of procedure in U.S. Pat. No. 3,654,090, Schuurs et al., after the antigen component and antibody component are formed, and are mixed with a fluid in which the presence or absence of one of the components is to be determined, sophisticated centrifugation is necessary.

SUMMARY OF THE INVENTION

In accordance with the present invention, an article has been developed which is easily employable in the office of a physician to determine the presence or absence of antigens or antibodies in body fluids and, in fact, can be employed with equal simplicity by an individual who wishes to make the necessary determination. The use of such an article, and the simple procedure employable with the article, are extremely valuable for rapid determination of various antigens or antibodies in human body fluids as, for example, in a pregnancy test.

In accordance with the procedure of the present invention, one component of the antigen-antibody reaction member is bonded to a test slide through use of a material which is nonparticulate and homogeneously dispersible on the slide and which, on application, generates a porous surface. The component is then bonded to this coating. The second component of the antigen-antibody reaction member is covalently bonded to a material capable of generating a colorimetric reaction. In use, the second component is incubated with a body fluid in which a determination is to be made as to the presence of the second component, and this mixture is flooded onto the test slide. The absence of color is a positive sign, indicating the presence of the component in the body fluid, while the presence of color is negative, indicating the absence of this component in the body fluid.

BRIEF DESCRIPTION OF THE DRAWINGS

In the accompanying drawings:

FIG. 1 is a plan view of the test slide of the present invention; and

FIG. 2 is a sectional view along the line 2—2 of FIG. 1.

DESCRIPTION OF THE PREFERRED EMBODIMENTS

The crux of the present invention is the article to be employed in the determination procedure, the coated test slide. The formation of this test slide will, therefore, be described first. In forming the test slide, a standard, glass slide is generally employed. However, synthetic plastic materials which will not react with the other reactants under the conditions of reaction can equally well be used, such a polymethyl methacrylate test slides. These test slides are first coated with gelatin containing the material which forms the porous, nonparticulate surface. Among the materials which can be employed for formation of such a surface are chrome alum, agar, agarose, and cross-linked dextran. Other materials capable of forming such a surface, which are, essentially, water insoluble after application, will be apparent to those skilled in the art. Chrome alum is the preferred material.

The initial coating of the test slide is accomplished by forming a mixture of the gelatin, porous-surface-forming material, particularly chrome alum, and distilled water. Though the amounts of material are not critical, there are generally from about 4 to 10 grams of gelatin and from 0.3 to 2.0 grams of the particulate-forming material for each liter of water. The mixture is held at an elevated temperature of approximately 50° to 60°C. for about 10 to 20 minutes, and insoluble materials remaining are filtered from the solution. The slides are dipped into the resulting solution and are air dried for several hours, for example, overnight, to assure proper curing of the applied materials.

After formation of the gelatin coated slides, where the gelatin contains a material which will form a porous surface on the slide, the component of the antigen-antibody reaction member is bonded to the slide in an insolubilized form. Before application of the insolubilized component, the previously coated slide is again dipped into a gelatin-porous-surface forming material solution, of the type just described, and is then treated with a few drops, e.g., two or three, of a conjugate of the component, either antigen or antibody, with a cyanogen bromide-treated Sepharose. Sepharose is a hydrogen bonded polysaccharide-type agarose gel.

The thus-prepared slide is allowed to air dry and is then desiccated for 1 hour. It can be used immediately in the procedure of the present invention, or it may be refrigerated until use is desired.

The thus-prepared test slide of the present invention is illustrated in the accompanying drawings where the underlying slide 1 has placed upon it a test spot 2.

One method of forming the conjugate of the antigen or antibody with the cyanogen bromide-treated Sepharose is to incubate a quantity of 15 grams of the cyanogen bromide-treated Sepharose with approximately 15 cc. of the antigen or antibody, the latter being in a concentration of 10 mg./ml. dissolved in 0.1 M sodium bicarbonate buffered solution containing 0.5 M sodium chloride. The Sepharose and antigen or antibody are incubated at 4°C. for 20 hours, and the conjugate is then washed and suspended in phosphate buffered saline at a pH of 7.2. The washed conjugate is blended with an equal volume of the saline solution in order to form the material which is placed upon the coated slide. In general, approximately 0.2 cc. of this blended material is applied to the slides so as to form a white coating for test purposes.

The only other material which must be prepared in order to carry out the procedure of the present invention is a conjugate of the other component of the antigen-antibody reaction with a material which is capable of generating a color reaction during the test. In particular, the other component of the antigen-antibody reaction can be conjugated with an enzyme which will react to provide a colorimetric determination. A preferred enzyme for such use is peroxidase. Other useful enzymes for this purpose are beta-glucuronidase, beta-D-glucosidase, beta-D-galactosidase, urease, glucose oxidase plus peroxidase, and galactose oxidase plus peroxidase. Such materials are described and a method of formation is given, for example, in the aforereferenced U.S. Pat. No. 3,654,090.

The just-referenced conjugate is formed by adding 12 mg. of the enzyme, particularly peroxidase, to 1 ml. of 0.1 M phosphase buffered solution at a pH of 6.8 containing 5 mg. of the antibody. To this mixture is added 0.05 ml. of a 1% aqueous solution of glutaraldehyde, and the new mixture is incubated for 2 hours at room temperature and then dialyzed against phosphate buffer and saline. The antibody conjugate is then precipitated with half saturated ammonium sulfate to separate the conjugate from any remaining free peroxidase. In order to render the resulting conjugate useful in the process of the present invention, it is subjected to successive dilutions to assure a colored end point with any of the various coloring agents which can be employed in the process, particularly as set forth in the examples which follow. The concentration of this conjugate is reduced by half with each dilution until a time when no color appears on the test slide. The dilution employed immediately before that is the concentration of the conjugate then employed in subsequent tests.

In order to employ the procedure and article of the present invention, a test solution of the body fluid which is to be tested for antigen or antibody presence is mixed with the component coupled to the material which will generate a color reaction, particularly one of the enzymes referred to above, and the mixture is incubated for approximately 2 minutes. This mixture is then applied to one of the test slides and, after a brief contact time of 1 to 2 minutes, the test slide is washed with distilled water. A coloring agent, activatable by the enzyme portion of the conjugate, is then applied to the test slide. If no color appears, this indicates the presence of the component in the body test fluid, indicating that this material has reacted with the component on the test slide. If a color does appear when the reagent is placed on the test slide in this last step, it indicates an absence of the component in the body test fluid, as it shows a reaction of the conjugate with the component on the test slide and, thus, the coupling of the enzyme which generates the color.

The coloring agent employed in the examples which follow is one formed of 4-chloro-1-napthol. It is formed by adding 0.5 ml. of a solution of the 4-chloro-1-naphthol (0.5 gm. dissolved in 25 ml. of diethylene glycol) to 2.5 ml. of 7% acetic acid in water and 13 ml. of diethylene glycol. To this solution is added 0.2 ml. of 3% hydrogen peroxide in water. The procedure just described forms a useful 4-chloro-1-naphthol color solution, but other coloring solutions formed by similar means will be apparent to those skilled in the art.

In order that those skilled in the art may be better enabled to practice the process of the present invention, and employ the article, the following examples are given. These examples should be considered illustrative of the present invention and not limiting in any way its scope:

EXAMPLE I

A test slide was coated with gelatin solution containing chrome alum in the manner set forth above and was allowed to air dry overnight. The slide was again coated in a similar solution, and three drops of a Sepharose conjugate of bovine serum albumin (BSA), formed in the manner described above, was applied to a central spot on the slide. The resulting article was air dried at room temperature.

EXAMPLE II

A second article was formed in the same manner as set forth in Example I, but employing two drops of a solution of human gamma globulin (HGG). This article, too, was allowed to air dry at room temperature.

EXAMPLE III

A third test slide was prepared employing the same procedure as Example I, with human chorionic gonadotrophin (HCG).

EXAMPLE IV

Two drops of a monospecific peroxidase conjugate antiserum directed against BSA are applied to one of the test slides formed according to Example I. The thus-treated test slide is allowed to incubate at room temperature for 2 minutes and is then washed with distilled water. A quantity of the 4-chloro-1-naphthol coloring reagent, formed as previously described (hereinafter referred to as the coloring reagent), is then applied to the central portion of the test slide, and what had originally been a white spot develops a purplish, blue hue of moderate intensity, indicating, through the development of the color by peroxidase, the reaction of the antibody in the peroxidase solution with the antigen on the test slide.

EXAMPLE V

A quantity of 0.2 cc. of a solution of the conjugate of Example IV is incubated for 2 minutes with 0.2 cc. of a body fluid for detection of the presence of the antigen for BSA in the body fluid. Approximately two drops of this mixture are applied to a test slide formed according to Example I. The purplish, blue hue developed on those test slides where no BSA antigen was present in the body fluid. In those body fluids having the antigen for BSA, no color developed on application of the coloring reagent.

EXAMPLE VI

In a manner similar to that set forth in Example IV, a monospecific peroxidase conjugate antiserum directed against HGG was applied to a test slide produced according to Example II. Upon application of the coloring reagent, a purplish, blue hue developed.

EXAMPLE VII

In a manner similar to that set forth in Example V, a mixture was formed of a human body fluid and the conjugate of Example VI in order to determine the presence of the HGG antigen in the human body fluid. Again, in those fluids containing the antigen, no color developed on application of the coloring reagent, while the purplish, blue hue developed when the human body fluid did contain the antigen.

EXAMPLE VIII

In a manner similar to that set forth in Example IV, a monospecific peroxidase conjugate antiserum directed against HCG was applied to a test slide produced according to Example III. After washing, and upon treatment with the coloring reagent, a purplish, blue hue developed in the center of the test slide.

EXAMPLE IX

In a manner similar to that set forth in Example V, a human body fluid was mixed with the conjugate of Example VIII and was applied to a test slide formed according to Example III. Again, the absence of color on application of the coloring reagent indicated the presence of the antigen in the human body fluid, while the absence of the color indicated the presence of the antigen in the human body fluid.

The examples set forth above were capable of detecting antigens in body fluids at levels of 0.1 to 1.0 mgm./ml. However, the sensitivity of the test slide was such as to have been able to detect levels of the antigen far below those of the range set forth.

While the examples set forth above specifically show the antibody applied to the test slide and the antigen conjugated with the enzyme, the article and procedure can equally well be employed with these components of the reaction reversed. Similarly, equivalent results are obtained when the peroxidase is replaced by one of the other enzymes and an indicating color member, activatable by that enzyme, as is well known in the art, is employed.

While specific embodiments of the article and procedure of the present invention have been shown and described, the invention should not be considered as limited to these specific examples, but only as limited by the appended claims.

I claim:

1. An article for use in determining the presence of one component of the antigen-antibody reaction member in a human body fluid, said article comprising:
   a. a test slide formed of a material inert to the reactants under the conditions of reaction;
   b. a first coating on said test slide formed from gelatin and a material which, upon drying, forms a porous surface; and
   c. a second coating of gelatin and a material which, upon drying, forms a porous surface; and, a small quantity of a conjugate of cyanogen bromide treated Sepharose and the other component of the antigen-antibody reaction member.

2. The article of claim 1 wherein the material which forms the porous surface is chrome alum.

3. The article of claim 1 wherein the material which forms the porous surface is agarose.

4. The article of claim 1 wherein the material which forms the porous surface is agar.

5. The article of claim 1 wherein the component conjugated to the cyanogen bromide treated Sepharose is bovine serum albumin.

6. The article of claim 1 wherein the component conjugated to the cyanogen bromide treated Sepharose is human gamma globulin.

7. The article of claim 1 wherein the component conjugated to the cyanogen bromide treated Sepharose is human chorionic gonadotrophin.

8. The article of claim 1 wherein the component bonded to the cyanogen bromide treated Sepharose is the antigen.

9. A procedure for determining the presence of one component of an antigen-antibody reaction member comprising:
   a. forming a test slide article according to claim 1;
   b. applying to said article a mixture of a human body fluid and a conjugate formed from the other component and an enzyme which will activate a coloring component;
   c. rinsing said article with distilled water; and
   d. applying a material which is activatable by said enzyme to produce a color.

10. The article of claim 9 wherein the material which forms the porous surface is chrome alum.

11. The article of claim 9 wherein the material which forms the porous surface is agarose.

12. The article of claim 9 wherein the material which forms the porous surface is agar.

13. The article of claim 9 wherein the component conjugated to the cyanogen bromide treated Sepharose is bovine serum albumin.

14. The article of claim 9 wherein the component conjugated to the cyanogen bromide treated Sepharose is human gamma globulin.

15. The article of claim 9 wherein the component conjugated to the cyanogen bromide treated Sepharose is human chorionic gonadotrophin.

16. The article of claim 9 wherein the component bonded to the cyanogen bromide treated Sepharose is the antigen.

* * * * *